United States Patent [19]

Lazear

[11] 4,112,146
[45] Sep. 5, 1978

[54] POLYESTER RESIN COMPOSITIONS WHICH ARE PHOTOCURABLE IN THE PRESENCE OF OXYGEN AND AN ORGANIC HYDRAZONE POLYMERIZATION INITIATOR

[75] Inventor: Nelson R. Lazear, Piscataway, N.J.

[73] Assignee: Celanese Corporation, New York, N.Y.

[21] Appl. No.: 800,477

[22] Filed: May 25, 1977

Related U.S. Application Data

[63] Continuation of Ser. No. 641,067, Dec. 15, 1975, abandoned.

[51] Int. Cl.$^2$ ............................ C08F 8/00; C08F 8/18; C08F 8/34
[52] U.S. Cl. ................................. 427/54; 96/115 P; 204/159.15; 204/159.16; 204/159.18; 204/159.19; 260/864; 260/872; 427/377; 427/378; 428/290; 428/480
[58] Field of Search ........................ 427/54; 428/290; 204/159.15, 159.16, 159.19, 159.18

[56] References Cited

U.S. PATENT DOCUMENTS

| | | | |
|---|---|---|---|
| 3,279,919 | 10/1966 | Laridan et al. | 96/35.1 |
| 3,296,337 | 1/1967 | Zimmerman | 260/867 |
| 3,326,710 | 6/1967 | Brodie | 427/54 |
| 3,898,144 | 8/1975 | Rudolph et al. | 204/159.15 |

*Primary Examiner*—Richard B. Turer
*Attorney, Agent, or Firm*—Kenneth A. Genoni

[57] ABSTRACT

Photocurable polyester resin compositions are provided which are adapted for use in coating applications. The polyester resin compositions are air-uninhibited and are low energy photocurable at room temperature as substantially 100% solids systems. The photocurable polyester resin compositions are cured by exposure to activating light, without the necessity of incorporating any additional ingredients in the polyester compositions.

Each photocurable polyester resin composition comprises a prepolymer(A) containing maleate and/or fumarate groups, and allyl ether groups; a solvent(B) which is a non-volatile polymerizable ester of acrylic or methacrylic acid derivative; and an organic polymerization initiator(C) which is photosensitive in the presence of oxygen.

26 Claims, No Drawings

POLYESTER RESIN COMPOSITIONS WHICH ARE PHOTOCURABLE IN THE PRESENCE OF OXYGEN AND AN ORGANIC HYDRAZONE POLYMERIZATION INITIATOR

This is a continuation of application Ser. No. 641,067, filed Dec. 15, 1975, now abandoned.

BACKGROUND OF THE INVENTION

Unsaturated polyester resins, which comprise a mixture of an ethylenically unsaturated copolymerizable monomer and a condensation polymer formed by polyesterifying dicarboxylic acids at least a portion of which contains ethylenic unsaturation with dihydric alcohols, can be cured to form thermosetting products which have uses in industry. These resins are particularly useful when glass fibers are dispersed therein as reinforcement. Pipes, panels and the like can be formed from such reinforced thermosetting resins.

In coating applications, curable unsaturated polyester resins are blended with a solvent and with a promoted catalyst system, and then heat cured after the composition is cast as a protective film on a substrate.

The disadvantages of such a coating system are manifold. Unsaturated polyester resins tend to be air-inhibited and do not easily cure into hard tough protective coatings. It is necessary to shield the polyester resin coating from contact with oxygen during the curing cycle. This may require the use of a paraffinic top coat over the polyester resin coating, or the placement of the coated substrate in an inert atmosphere.

The solvent in the conventional polyester coating systems must volatilize during the drying and curing cycle. Even in the case of a polymerizable solvent such as styrene, a considerable quantity of styrene volatilizes under the temperature conditions of the curing cycle.

Furthermore, a high energy input is required to achieve a fully cured thermoset coating. And in many cases, the volatilization of coating composition components is deleterious to the coherency of the coating film.

As a further disadvantage of conventional polyester coating systems, it is necessary to formulate the polyester prepolymer and other polymerizable components of a curable system with the required polymerization catalysts and promoters immediately prior to the spraying or casting of the system. There is a need for polyester coating systems which can be formulated and stored, and then employed directly in coating applications without the inclusion of additional ingredients.

Accordingly, it is an object of this invention to provide curable air-uninhibited unsaturated polyester resin compositions.

It is another object of the present invention to provide polyester coating compositions which do not contain volatile components and which cure as substantially 100% solids systems.

It is another object of the present invention to provide low energy room temperature photocurable unsaturated polyester compositions suitable for coating and molding applications.

It is another object of the present invention to provide unsaturated polyester resin compositions, the curing of which is promoted by the presence of oxygen.

It is a further object of this invention to provide unsaturated polyester resin compositions, the curing of which is promoted by low energy ultraviolet irradiation.

It is still another object of this invention to provide curable polyester resin compositions which are fully integrated polymerization systems which can be preformulated and stored, and then applied as coatings and the like without the need to include additional composition ingredients.

Other objects and advantages of the present invention shall become apparent from the accompanying description and examples.

DESCRIPTION OF THE INVENTION

One or more objects of the present invention are accomplished by the provision of photocurable air-uninhibited polyester resin compositions comprising a prepolymer component (A) which contains between 2 and about 10 maleate and/or fumarate groups, and between 1 and about 5 allyl ether groups, and has a molecular weight between about 500 and 3000; a solvent component (B) which is selected from polymerizable acrylic acid and/or methacrylic acid ester derivatives; and an organic polymerization initiator component (C) which is photosensitive (i.e., light-activated) in the presence of oxygen.

By the term "light-activated" or "photosensitive" is meant a polymerization initiator (C) which remains as an inert substance in the invention curable polyester resin compositions in the absence of light, and which converts into a hydroperoxide intermediate and initiates the formation of free radicals in the presence of light and molecular oxygen.

Unsaturated polyester resins are well known in the art (e.g., U.S. Pat. No. 2,255,313). The unsaturated polyester portion is a condensation polymer formed by polyesterifying dicarboxylic acids or anhydrides with dihydric alcohols. The term "unsaturated polyester" as used herein is defined as the condensation polymer produced by condensing dicarboxylic acid or its anhydride with the dihydric alcohol in approximately equimolar proportions and wherein at least a portion of which the dicarboxylic compound contains ethylenic unsaturation. The term "polyester resin composition" as used herein is meant to define the combination of (A) the condensation polymer or unsaturated polyester defined above; and (B) a polymerizable acrylic and/or methacrylic acid ester derivative.

To provide unsaturation within the polyester prepolymer component (A), at least about 25 mole percent of the total dicarboxylic acids or anhydrides must contain ethylenic unsaturation. For purposes of the present invention, it is highly preferred that the prepolymer component (A) contain between 2 and about 10 maleate and/or fumarate groups per molecule.

Examples of suitable unsaturated dicarboxylic acids include maleic, fumaric, itaconic, aconitic, mesaconic, citraconic, ethylmaleic and dichloromaleic acid. Also the anhydrides of these unsaturated dicarboxylic acids are contemplated by this invention. The remainder of the dicarboxylic acids (up to about 75 mole percent) may be a cyclic dicarboxylic acid or anhydride such as for example: phthalic acid or phthalic anhydride, tetrahydrophthalic acid, hexanhydrophthalic acid, trans-1,4-cyclohexane dicarboxylic acid; 1,4- or 1,5- or 2,6- or 2,7-naphthalene dicarboxylic acid, and endo-cis bicyclo(2.2.1)-5-heptene-2,3-dicarboxylic acid. Other dicarboxylic acids suitable in the practice of the invention are straight chain saturated aliphatic dicarboxylic acids, such as for example, succinic acid, glutaric acid, adipic acid, and the like. A minor proportion of a polycarboxylic acid such as polyacrylic acid can also be included in the prepolymer component (A).

It is an essential feature of the present invention that the prepolymer component(A) contain between 1 and about 5 allyl ether groups per molecule. Allyl ether groups are conveniently incorporated into prepolymer component (A) during prepolymer (A) formation in the form of a monohydric or polyhydric alcohol. Preferred allyl ether alcohol reactants include trimethylolpropane monoallyl ether and diallyl ether derivatives; pentaerythritol diallyl ether and triallyl ether derivatives; glycerol monoallyl ether and diallyl ether derivatives; and the like.

In the formation of the prepolymer component(A), the dicarboxylic acids or anhydrides are polyesterified with approximately equimolar quantities of dihydric alcohol. These dihydric alcohols can be any of the commonly used alkane diols or oxy alkane diols such as ethylene glycol, propylene glycol, diethylene glycol, dipropylene glycol, 1,3-butanediol, neopentyl glycol or the like, as well as saturated cyclic dihydric alcohols such as 1,4-cyclohexane dimethanol, hydrogenated bisphenol A or the like, as well as mixtures of the foregoing. A minor proportion of trihydric or higher functional polyols can be included if it is desirable to modify the crosslinked structure of prepolymer component(A).

The polyester prepolymer component(A) is prepared by polyesterifying the ingredients as described above in accordance with the well known procedures for producing condensation resins. The polyesters may be produced by either the so-called fusion or the solvent process. Optionally present during the polycondensation or polyesterification are esterification catalysts such as tin chloride, zinc chloride, zinc acetate, nickel acetate or cadmium acetate. Also a gelatin inhibitor such as hydroquinone or para-tert-butyl-catechol may be added to the polycondensate. The gelation inhibitor inhibits premature polymerization of the unsaturated polyester.

A particularly interesting prepolymer component(A) formulation is one which contains Bisphenol A, allyl ether, and acrylate or fumarate moieties. Illustrative of this formulation is the following structure:

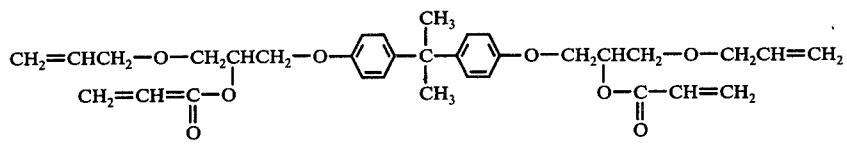

The molecular weight of the prepolymer component(A) is conveniently measured by the acid number of the polyester. This measurement is based on milliequivalents of KOH necessary to neutralize 1 gram of the polyester. For example, when the esterification is carried out by the so-called fusion process, the esterification is carried out under an inert blanket of gas such as nitrogen in a temperature range of about 180°–220° C for a period of 6–20 hours until an acid number below 100 and preferably below 50 is obtained. Esterification catalysts can be used as well as gelation inhibitors, such as are well known in the art.

The prepolymer component(A) is admixed with solvent component(B) and photosensitive organic polymerization initiator component(C) for the preparation of the photocurable air-uninhibitor polyester resin compositions of the present invention. Preferably, the formulation procedure is conducted with the exclusion of light and oxygen to the greatest degree that is practical.

The solvent component(B) is selected from nonvolatile polymerizable esters of acrylic or methacrylic acids and derivatives and mixtures thereof. The solvent component(B) is preferably a liquid at room temperature (25° C), and has a molecular weight of at least about 100. Suitable solvents include methyl methacrylate, butyl methacrylate, pentaerthritol trimethacrylate, trimethylolpropane trimethacrylate, hexanediol diacrylate, hexanediol dimethacrylate, 1,3-butylene glycol dimethacrylate, diethylene glycol diacrylate, and the like. The solvent component(B) can contain nitrogen, halogen, phosphorus, alkyl, alkenyl, allyl ether and other substituents which contribute desirable properties to the polyester resin compositions.

In polyester resin compositions, the quantity of solvent component(B) contained therein can vary over a wide range between about 20 and 80 weight percent, based on the total weight of resin composition. If the polyester resin composition has a high viscosity, the addition of a small quantity of solvent such as benzene, toluene or styrene can be advantageous in the case of low temperature coating applications, and the like. The addition of such solvents is to be avoided if a 100% solids system is required.

The polymerization initiator(C) is selected from organic compounds which react with molecular oxygen to form hydroperoxide derivatives under the influence of activating light.

Illustrative of preferred organic polymerization initiator(C) compounds are hydrazone derivatives corresponding to the formula:

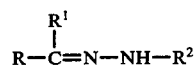

wherein R is selected from the group consisting of hydrogen and aliphatic, alicyclic and aromatic hydrocarbon radicals containing between 1 and about 12 carbon atoms; $R^1$ is selected from aliphatic, alicyclic and aromatic hydrocarbon radicals containing between 1 and about 12 carbon atoms; $R^2$ is selected from aliphatic and alicyclic hydrocarbon radicals containing between 1 and about 6 carbon atoms; and R and $R^1$ taken together can be an alicyclic hydrocarbon radical.

Illustrative of R and $R^1$ substituents in the hydrazone formula are methyl, ethyl, isopropyl, pentyl, decyl, cyclopropyl, cyclopentyl, cyclohexyl, phenyl, tolyl, xylyl, phenylethyl, naphthyl, and the like. Illustrative of $R^2$ substituents are methyl, ethyl, isopropyl, tertiary-butyl, pentyl, hexyl, cyclohexyl, and the like. R, $R^1$ and $R^2$ can also contain elements such as oxygen, sulfur, nitrogen, halogen, silicon, and the like, in forms which do not interfere with the functioning of the polymerization initiator(C) in the resin polymerization systems or have a deleterious effect on the final properties of the resultant thermoset resin compositions of the present invention.

The hydrazone derivatives are readily prepared by the reaction of selected aldehydes and ketones with substituted hydrazine derivatives having the formula $R^2-NH-NH_2$.

Under the activating influence of light, the organic polymerization initiator(C) reacts with molecular oxygen to form a hydroperoxide intermediate, which in turn generates the formation of free radicals for initiation of vinyl polymerization.

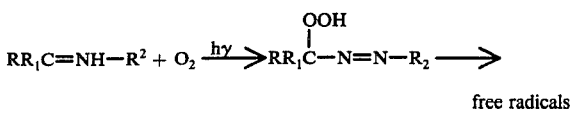

$$RR_1C=NH-R^2 + O_2 \xrightarrow{h\nu} RR_1\overset{OOH}{\underset{|}{C}}-N=N-R_2 \longrightarrow \text{free radicals}$$

The quantity of photosensitive polymerization initiator(C) incorporated in the invention photocurable polyester resin compositions can vary over a broad range between about 0.01 and 15 weight percent, based on the total weight of the polymerizable polyester resin components.

If desired, a polymerization accelerator can be included in the photocurable resin compositions. Useful polymerization accelerators include cobalt naphthenate, cobalt octoate, iron naphthenate, dialkylaniline, alkyl mercaptan, arylethanolamine, metal acetylacetonate, and the like. The polymerization accelerators are employed in a quantity which varies between about 0.01 and 5 weight percent, based on the total weight of the polymerizable polyester resin components.

Coloring agents such as titanium dioxide and iron oxide, and fillers such as calcium carbonate and talc, can be included in the photocurable polyester resin compositions. Other additives such as flame retardants can also be incorporated, e.g., hexachlorophene, antimony oxide, and the like. Depending on the applications, reinforcing materials can also be included. The production of fiber-reinforced composite moldings are an important aspect of the present invention 100% solids polyester resin compositions. Glass, carbon, aluminosilicate and other such fibers can be employed as a reinforcing matrix.

An essential feature of the present invention polyester resin compositions is their amenability to photopolymerization with low energy activation. The polymerization reaction can be initiated by irradiation with a light source having a wavelength in the range between about 2000 and 6000 angstroms. Suitable light sources are sun light, sunlamps, mercury arcs, carbon arcs, tungsten filament lamps, xenon arcs, krypton arcs, lasers, and the like.

Generally, the curing time will range from about 1-5 seconds to several minutes for a 30 micron coating exposed to air and ultraviolet light at a temperature of about 50°-100° C. Under ambient conditions of temperature and light, resin coatings of the present invention can cure to a non-tacky state within two days.

The present invention curable air-uninhibited polyester resin compositions are latently reactive, stable in storage, and can be polymerized to thermoset resins under the influence of light and oxygen without the incorporation of additional composition components.

The preferred polyester resin compositions can be room temperature cured as substantially 100% solids coating and molding systems. The prepolymer component(A) and the solvent component(B) copolymerize during the curing cycle. There are no components in the polyester resin compositions which volatilize during the thermosetting stage.

After a photocurable polyester resin composition of the present invention has been sprayed, cast or molded by conventional procedures, contact of the exposed surface of the shaped polyester resin with oxygen and light irradiation activates the polymerization initiator system, thereby converting the resin matrix into a cross-linked thermoset product. The polymerization reaction rate can be accelerated by increasing the quantity of molecular oxygen and/or the energy quantum of irradiation in contact with the polyester resin surface.

The polyester resin compositions of the present invention are unique in that they are air-uninhibited and cure readily in the presence of oxygen. Furthermore, it has been found that the presence of oxygen accelerates the curing of the invention polyester resin compositions. Hence, it is advantageous to cure coated substrates, for example, in contact with a flow of air.

When a promoted initiator system such as a combination of hydrazone compound and cobalt naphthenate is incorporated in the polyester resin compositions, low energy curing proceeds at room temperature or lower under the influence of light and oxygen. No heating is required to effect curing. As a practical matter, in a large scale manufacturing operation such as the protective coating of appliances, enhanced efficiency and economy can be achieved by subjecting the coated substrates to a 5-minute exposure to ultraviolet light in a flow of circulating air at a temperature of 65° C. Hard glossy thermoset coatings result from this treatment.

Many of the unique properties of the present invention polyester resin compositions are attributable to the presence of allyl ether groups therein. Because of the allyl ether groups, the polyester resin compositions are not only air-uninhibited, but are more rapidly cured in the presence of oxygen. It is believed that the polyester resin compositions are air-uninhibited because the allyl ether groups contained therein function as oxygen scavengers. Furthermore, the fact that the curing of the polyester resin compositions is actually promoted by oxygen would indicate that oxygen interacts with allyl ether groups to provide a source of initiating free radicals in the copolymerization thermosetting reaction during the curing cycle.

The following examples are further illustrative of the present invention. The reactants and other specific ingredients are presented as being typical, and various modifications can be devised in view of the foregoing disclosure within the scope of the invention.

EXAMPLE I

Preparation of Hydrazone Polymerization Initiator

A mixture of 10.99 grams (0.112M) of cyclohexanone, 20.64 grams (0.449M) of methylhydrazine and 11,33 grams (0.112 M) of triethylamine in 350 mls of ethanol is refluxed for 3 hours. The low-boiling components are removed on a rotary evaporator to yield 12.23 grams of a brown oil. Analysis of this mixture by gas chromatography indicates that the oil contains 87.23% cyclohexanone methylhydrazone (75.5% yield based on cyclohexanone).

EXAMPLE II

Preparation of A Thermoset Coating

A mixture of 2.5 grams of Roskydal 650*, 2.5 grams of butyl methacrylate, 0.1 grams of cobalt naphthenate and 0.6 gram of cyclohexanone methylhydrazone is drawn down on a Bonderite 1000 Panel. The panel is placed in an ultraviolet oven at 65° C for 1–2 minutes until a tack free surface is obtained. The Pencil hardness is 5B-2H.

*(Mobay). A maleic anhydride type of polyester which contains allyl ether groups.

EXAMPLE III

A resin composition is prepared by admixing the following ingredients:

| | |
|---|---|
| Roskydal 650 (Mobay) | 2.5 grams |
| Trimethylolpropane trimethacrylate | 2.5 grams |
| Nuodex (Tenneco, 6% cobalt) | 0.2 gram |
| Acetophenone methylhydrazone | 0.6 gram |

The resin composition is cast on a steel substrate and cured at 65° C for 1 minute in an ultraviolet oven. The cured coating is hard and glossy.

EXAMPLE IV

A resin composition is prepared from the following ingredients:

| | |
|---|---|
| Roskydal 650 | 2.5 grams |
| Butyl methacrylate | 2.5 grams |
| Nuodex | 0.1 gram |
| Methyl ethyl ketone butylhydrazone | 0.3 gram |

A coating is cast on a steel plate and cured at 65° C for one minute in an ultraviolet oven. The cured coating is flexible and glossy.

EXAMPLE V

Resin compositions are prepared from the following ingredients:

| | | |
|---|---|---|
| (a) | Roskydal 650 | 2.9 grams |
| | 1,3-Butylene glycol dimethacrylate | 2.5 grams |
| | Nuodex | 0.2 gram |
| | Benzophenone methylhydrazone | 0.2 gram |
| (b) | Roskydal 650 | 2.5 grams |
| | Trimethylolpropane triacrylate | 2.5 grams |
| | Nuodex | 0.2 gram |
| | Benzophenone methylhydrazone | 0.6 gram |

The resin compositions are cast on steel plates and cured at 65° C for 2 minutes in an ultraviolet oven. The cured coatings are hard and glossy.

EXAMPLE VI

A composition is prepared from the following ingredients:

| | |
|---|---|
| Roskydal 650 | 16.5 grams |
| Trimethylolpropane trimethacrylate | 16.5 grams |
| Titanox A MP (NL Industries) | 16.5 grams |

The mixture is ground for 30 minutes in a Sorvall Ommi-mixer. About 7 grams of the ground mixture is blended with 0.2 grams of Nuodex, 0.6 gram of cyclohexanone methylhydrazone and 1.3 grams of toluene.

A coating of the composition is cast on a steel plate and cured at 100° for 5 seconds in an ultraviolet oven. The cured coating is hard and glossy.

EXAMPLE VII

A resin composition is prepared from the following ingredients:

| | |
|---|---|
| Trimethylolpropane monoallyl ether | 218 grams |
| Trimethylolpropane diallyl ether | 131 grams |
| 1,3-Butylene glycol | 508 grams |
| Maleic anhydride | 447 grams |
| Phthalic anhydride | 289 grams |
| Hydroquinone | 0.1 gram |

The glycol and anhydride ingredients are heated together at 200° C until the mixture has an acid value of about 155–165 (approximately 15–18 mls of recovered water). The remaining ingredients are then added and the mixture is heated until an acid value of 35 is attained.

Approximately 75 grams of the resin composition so produced is blended with 25 grams of 1,6-hexanediol diacrylate. A coating produced from this composition with 5 grams of benzaldehyde methylhydrazone is flexible and glossy after curing for 1 week under ambient conditions of temperature and light. The same results are obtained if the coating is heated at 65° C for 1 minute in an ultraviolet oven.

EXAMPLE VIII

Following the procedure of Example VII, an air-uninhibited photocurable coating composition is prepared from the following ingredients:

| | |
|---|---|
| Trimethylolpropane diallyl ether | 87 grams |
| 1,3-Butylene glycol | 171 grams |
| Tetrahydrophthalic anhydride | 61 grams |
| Maleic anhydride | 61 grams |
| Hydroquinone (0.01% based on TMPDAE) | |

One hundred grams of the resin composition so produced is blended with the following ingredients:

| | |
|---|---|
| 1,6-Hexanediol dimethacrylate | 50 grams |
| General Electric SF1023 (1% in toluene) | 3 grams |
| NO 78 Alkyl resin (60% in xylene, Celanese | 3 grams |
| Nuodex | 1 gram |
| Cyclohexanone methylhydrazone | 2 grams |

A coating prepared from this formulation is hard and glossy after exposure to ultraviolet light and air.

EXAMPLE IX

A photocurable resin composition is prepared from the following ingredients:

| | |
|---|---|
| Pentaerythritol diallyl ether | 44 grams |
| 1,2-Propylene glycol | 15 grams |
| Maleic anhydride | 27 grams |
| Phthalic anhydride | 13 grams |
| Hydroquinone | 0.02 gram |

The mixture is heated at 150° C for 2 hours. Xylene is added and the heating is continued at 180° C until an acid value of 50 is attained.

The resin composition is blended with 1,3-butylene glycol dimethacrylate to form a 65% solids mixture, and methyl ethyl ketone tertiary-butylhydrazone and cobalt naphthenate are added as a polymerization initiator system.

Films cast from the resin composition are hard and glossy after curing for 5 seconds at 100° C in an ultraviolet oven.

EXAMPLE X

A photocurable resin composition is prepared from the following ingredients in the manner of Example VII:

| | |
|---|---|
| Trimethylolpropane diallyl ether | 150 grams |
| Ethylene glycol | 75 grams |
| 1,3-Butylene glycol | 40 grams |
| Maleic anhydride | 175 grams |
| Hydroquinone (0.01% based on TMPDAE) | |
| Cyclohexanone methylhydrazone | 10 grams |
| Cobalt naphthenate | 2 grams |
| 1,6-Hexanediol dimethylacrylate | 100 grams |

A coating prepared from this formulation is hard and glossy after exposure to ambient conditions of temperature and light for 1 week.

What is claimed is:

1. An air-uninhibited polyester resin composition which is room temperature curable as a substantially 100 percent solids system without the incorporation of additional ingredients by exposure of the polyester resin composition to the action of oxygen and light, wherein said polyester resin composition comprises a prepolymer component (A) which contains between 2 and about 10 maleate and/or fumarate groups, and between 1 and about 5 allyl ether groups, and has a molecular weight between about 500 and 3000; a solvent component (B) which is a polymerizable acrylic or methacrylic acid ester derivative which is a liquid at 25° C and has a molecular weight of at least about 100; and an organic hydrazone polymerization initiator component (C) which is photosensitive in the presence of oxygen, corresponding to the formula:

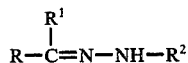

where R is selected from the group consisting of hydrogen and aliphatic, alicyclic and aromatic hydrocarbon radicals containing between 1 and about 12 carbon atoms; $R^1$ is selected from aliphatic, alicyclic and aromatic hydrocarbon radicals containing between 1 and about 12 carbon atoms; $R^2$ is selected from aliphatic and alicyclic hydrocarbon radicals containing between 1 and about 6 carbon atoms; and R and $R^1$ taken together can be an alicyclic hydrocarbon radical.

2. A polyester resin composition in accordance with claim 1 wherein the prepolymer component (A) is a condensate of trimethylolpropane monoallyl ether, dihydric polyol and maleic and/or fumaric acid or anhydride.

3. A polyester resin composition in accordance with claim 1 wherein the prepolymer component (A) is a condensate of trimethylolpropane diallyl ether, 1,3-butylene glycol and maleic acid or anhydride.

4. A polyester resin composition in accordance with claim 1 wherein the prepolymer component (A) contains phthalic acid groups.

5. A polyester resin composition in accordance with claim 1 wherein the prepolymer component (A) contains tetrahydrophthalic acid groups.

6. A polyester resin composition in accordance with claim 1 wherein the prepolymer component (A) contains 1,2-propylene glycol condensate.

7. A polyester resin composition in accordance with claim 1 wherein the prepolymer component (A) contains ethylene glycol condensate.

8. A polyester resin composition in accordance with claim 1 wherein the prepolymer component (A) contains diethylene glycol condensate.

9. A polyester resin composition in accordance with claim 1 wherein the prepolymer component (A) contains 1,6-hexanediol condensate.

10. A polyester resin composition in accordance with claim 1 wherein the prepolymer component (A) contains 1,3-propanediol condensate.

11. A polyester resin composition in accordance with claim 1 wherein the prepolymer component (A) is a condensate containing bisphenol A, allyl ether, and acrylate and/or fumarate moieties.

12. A polyester resin composition in accordance with claim 1 wherein the solvent component (B) comprises n-butyl methacrylate.

13. A polyester resin composition in accordance with claim 1 wherein the solvent component (B) comprises 1,3-butylene glycol dimethacrylate.

14. A polyester resin composition in accordance with claim 1 wherein the solvent component (B) comprises 1,6-hexanediol diacrylate.

15. A polyester resin composition in accordance with claim 1 wherein the solvent component (B) comprises 1,6-hexanediol dimethacrylate.

16. A polyester resin composition in accordance with claim 1 wherein the solvent component (B) comprises pentaerythritol trimethacrylate.

17. A polyester resin composition in accordance with claim 1 wherein the solvent component (B) comprises 1,6-hexanediol diacrylate and trimethylolpropane trimethacrylate.

18. A polyester resin composition in accordance with claim 1 wherein the hydrazone polymerization initiator component (C) is cyclohexanone methylhydrazone.

19. A polyester resin composition in accordance with claim 1 wherein the hydrazone polymerization initiator component (C) is acetophenone methylhydrazone.

20. A polyester resin composition in accordance with claim 1 wherein the hydrazone polymerization initiator component (C) is methyl ethyl ketone butylhydrazone.

21. A polyester resin composition in accordance with claim 1 wherein the hydrazone polymerization initiator component (C) is benzophenone methylhydrazone.

22. A polyester resin composition in accordance with claim 1 wherein the hydrazone polymerization initiator component (C) is benzaldehyde methylhydrazone.

23. A polyester resin composition in accordance with claim 1 wherein the hydrazone polymerization initiator component (C) is methyl ethyl ketone tertiary-butylhydrazone.

24. A photocurable air-uninhibited polyester resin composite comprising the polyester resin composition of claim 1 and a fiber matrix.

25. A method for providing a protective film or decorative coating on a surface which comprises coating said surface with a polyester resin composition of claim 1 and allowing sufficient time for the curing of said polyester composition in an environment of oxygen and ultraviolet light.

26. A method in accordance with claim 25 wherein the curing of said polyester resin coating is accelerated by contacting said coating with a flow of circulating air.

* * * * *